US012409655B2

(12) United States Patent
DeBrabander et al.

(10) Patent No.: US 12,409,655 B2
(45) Date of Patent: Sep. 9, 2025

(54) REDUCING SIZE VARIATIONS IN FUNNEL NOZZLES

(71) Applicant: FUJIFILM Dimatix, Inc., Lebanon, NH (US)

(72) Inventors: Gregory DeBrabander, San Jose, CA (US); Mark Nepomnishy, San Jose, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 441 days.

(21) Appl. No.: 18/092,954

(22) Filed: Jan. 4, 2023

(65) Prior Publication Data

US 2023/0133379 A1 May 4, 2023

Related U.S. Application Data

(63) Continuation of application No. 17/075,840, filed on Oct. 21, 2020, now Pat. No. 11,571,895, which is a (Continued)

(51) Int. Cl.
*B41J 2/16* (2006.01)
*B41J 2/14* (2006.01)

(52) U.S. Cl.
CPC ............ *B41J 2/162* (2013.01); *B41J 2/1625* (2013.01); *B41J 2/1628* (2013.01); *B41J 2/1631* (2013.01); *B41J 2002/14475* (2013.01)

(58) Field of Classification Search
CPC ........ B41J 2/162; B41J 2/1621; B41J 2/1626; B41J 2/1628; B41J 2/1625; B41J 2/1631
See application file for complete search history.

(56) References Cited

U.S. PATENT DOCUMENTS

| | | | |
|---|---|---|---|
| 4,857,477 | A | 8/1989 | Kanamori |
| 5,084,416 | A | 1/1992 | Ozaki et al. |

(Continued)

FOREIGN PATENT DOCUMENTS

| | | | |
|---|---|---|---|
| CN | 1417033 | A | 5/2003 |
| CN | 101035678 | A | 9/2007 |

(Continued)

OTHER PUBLICATIONS

Extended European Search Report in EP Application No. 13164670.5, dated Aug. 9, 2013, 7 pages.

(Continued)

*Primary Examiner* — Scott A Richmond
(74) *Attorney, Agent, or Firm* — Fish & Richardson P.C.

(57) ABSTRACT

Techniques are provided for making a funnel-shaped nozzle in a substrate. The process can include forming a first opening having a first width in a top layer of a substrate, forming a patterned layer of photoresist on the top surface of the substrate, the patterned layer of photoresist including a second opening, the second opening having a second width larger than the first width, reflowing the patterned layer of photoresist to form curved side surfaces terminating on the top surface of the substrate, etching a second layer of the substrate through the first opening in the top layer of the substrate to form a straight-walled recess, the straight-walled recess having the first width and a side surface substantially perpendicular to the top surface of the semiconductor substrate.

20 Claims, 9 Drawing Sheets

Related U.S. Application Data continuation of application No. 16/677,818, filed on Nov. 8, 2019, now Pat. No. 10,850,518, which is a continuation of application No. 16/026,962, filed on Jul. 3, 2018, now Pat. No. 10,471,718, which is a continuation of application No. 15/440,435, filed on Feb. 23, 2017, now Pat. No. 10,052,875.

(56) References Cited

U.S. PATENT DOCUMENTS

| | | | |
|---|---|---|---|
| 5,166,088 | A | 11/1992 | Ueda et al. |
| 5,258,332 | A | 11/1993 | Horioka et al. |
| 5,439,782 | A | 8/1995 | Haemmerle |
| 6,170,934 | B1 | 1/2001 | Fujisawa et al. |
| 6,320,246 | B1 | 11/2001 | Gilton |
| 6,569,343 | B1 | 5/2003 | Suzuki et al. |
| 7,703,069 | B1 | 4/2010 | Liu et al. |
| 8,551,692 | B1 | 10/2013 | De Brabander et al. |
| 8,563,325 | B1 | 10/2013 | Bartsch et al. |
| 10,471,718 | B2 | 11/2019 | DeBrabander et al. |
| 11,571,895 | B2 | 2/2023 | DeBrabander et al. |
| 2001/0051434 | A1 | 12/2001 | Gilton |
| 2002/0160579 | A1 | 10/2002 | Kim |
| 2003/0122896 | A1 | 7/2003 | Jeong et al. |
| 2005/0084807 | A1 | 4/2005 | Meagley et al. |
| 2005/0094907 | A1 | 5/2005 | Kim |
| 2006/0054590 | A1 | 3/2006 | Krawczyk et al. |
| 2006/0158486 | A1 | 7/2006 | Bibl et al. |
| 2007/0072389 | A1 | 3/2007 | Cho et al. |
| 2007/0284692 | A1 * | 12/2007 | Lee .................. H01L 21/76232 257/E21.549 |
| 2007/0293044 | A1 | 12/2007 | Perozziello et al. |
| 2008/0143785 | A1 | 6/2008 | Houjou |
| 2009/0073241 | A1 | 3/2009 | Sim et al. |
| 2010/0053270 | A1 | 3/2010 | Xu et al. |
| 2010/0141709 | A1 | 6/2010 | Brabander et al. |
| 2011/0181664 | A1 | 7/2011 | Nepomnishy et al. |
| 2012/0001986 | A1 | 1/2012 | Kim |
| 2012/0115074 | A1 | 5/2012 | Zhang et al. |
| 2013/0068724 | A1 | 3/2013 | Van Der Meer et al. |
| 2013/0162724 | A1 | 6/2013 | Pugliese, Jr. et al. |
| 2013/0210175 | A1 | 8/2013 | Hoisington et al. |
| 2013/0286097 | A1 * | 10/2013 | De Brabander ....... B41J 2/1433 438/21 |
| 2013/0299950 | A1 | 11/2013 | Hummler |
| 2014/0022304 | A1 | 1/2014 | Brabander et al. |
| 2014/0361349 | A1 | 12/2014 | Alexandrov et al. |
| 2016/0276152 | A1 | 9/2016 | Tachibana et al. |
| 2018/0326729 | A1 | 11/2018 | DeBrabander et al. |
| 2020/0070518 | A1 | 3/2020 | DeBrabander et al. |
| 2021/0031521 | A1 | 2/2021 | DeBrabander et al. |

FOREIGN PATENT DOCUMENTS

| | | | |
|---|---|---|---|
| CN | 101035682 | A | 9/2007 |
| CN | 101119850 | A | 2/2008 |
| CN | 101927603 | A | 12/2010 |
| CN | 102431303 | A | 5/2012 |
| CN | 103026520 | A | 4/2013 |
| CN | 103373071 | A | 10/2013 |
| CN | 103847233 | A | 6/2014 |
| CN | 104085195 | A | 10/2014 |
| CN | 105102230 | A | 11/2015 |
| CN | 105109207 | A | 12/2015 |
| JP | S54-056433 | A | 1/1993 |
| JP | 2001-199062 | A | 7/2001 |
| JP | 2007-175992 | A | 7/2007 |
| JP | 2008-524031 | A | 7/2008 |
| JP | 2008-238485 | A | 10/2008 |
| JP | 2008-273036 | A | 11/2008 |
| JP | 2009-006501 | A | 1/2009 |
| JP | 2010-125853 | A | 6/2010 |
| JP | 2010-267951 | A | 11/2010 |
| JP | 2013-230676 | A | 11/2013 |
| JP | 2014-113822 | A | 6/2014 |
| KR | 100761466 | B1 | 9/2007 |
| WO | WO 2006066102 | A1 | 6/2006 |
| WO | WO 2008050287 | A1 | 5/2008 |
| WO | WO 2011151206 | A1 | 12/2011 |

OTHER PUBLICATIONS

Extended European Search Report issued in European Application No. 18757264.9 mailed on Feb. 5, 2020, 9 pages.

International Search Report and Written Opinion issued in PCT/US2018/019208 on Apr. 6, 2018, 9 pages.

Machine Translation of Ryu et al."Device Isolation Structure Incorporated in Semiconductor Device and Method of Forming the Same" KR 100761466 B1, Sep. 27, 2007, 6 pages.

Office Action issued in Chinese Application No. 201880020759.2 on Aug. 10, 2020, 17 pages (with English translation).

Office Action issued in Chinese Application No. 201880020759.2 on Mar. 10, 2021, 13 pages (with English translation).

Office Action issued in Chinese Application No. 201880020759.2 on Sep. 3, 2021, 7 pages (with English translation).

Office Action issued in Chinese Application No. 202111351926.1 dated Nov. 7, 2022, 19 pages (with English translation).

Office Action issued in Japanese Application No. 2019-545754 on Apr. 14, 2021, 8 pages (with English translation).

Office Action issued in Japanese Application No. 2019-545754, dated Aug. 25, 2021, 6 pages (with English translation).

Office Action issued in Japanese Application No. 2019-545754, dated Nov. 24, 2021, 5 pages (with English translation).

Office Action issued in Japanese Application No. 2021-210868, dated Aug. 17, 2022, 12 pages (with English translation).

Office Action issued in Japanese Application No. 2021-210868, dated Feb. 8, 2023 12 pages (with English translation).

Extended European Search Report in EP Application No. 22182972.4, mailed on Apr. 20, 2023, 8 pages.

* cited by examiner

REDUCING SIZE VARIATIONS IN FUNNEL NOZZLES

BACKGROUND

This specification relates to nozzle formation in a microelectromechanical device, such as an inkjet print head.

Printing a high quality, high resolution image with an inkjet printer generally requires a printer that accurately ejects a desired quantity of ink at a specified location on a printing medium. Typically, a multitude of densely packed ink ejecting devices, each including a nozzle and an associated ink flow path are formed in a print head structure. The ink flow path connects an ink storage unit, such as an ink reservoir or cartridge, to the nozzle. The ink flow path includes a pumping chamber. In the pumping chamber, ink can be pressurized to flow toward a descender region that terminates in the nozzle. The ink is expelled out of an opening at the end of the nozzle and lands on a printing medium. The medium can be moved relative to the fluid ejection device. The ejection of a fluid droplet from a particular nozzle is timed with the movement of the medium to place a fluid droplet at a desired location on the medium.

Various processing techniques can be used to form the ink ejectors in the print head structure. These processing techniques can include layer formation, such as deposition and bonding, and layer modification, such as etching, laser ablation, punching and cutting. The techniques that are used can differ depending on desired nozzle shapes, flow path geometry, along with the materials used in the inkjet printer, for example.

SUMMARY

A funnel-shaped nozzle having a straight-walled bottom portion and a curved top portion is disclosed. The curved top portion of the funnel-shaped nozzle gradually converges toward and is smoothly joined to the straight-walled bottom portion. The funnel-shaped nozzle can have one or more side surfaces around an axis of symmetry, and cross-sections of the curved top portion and the straight-walled bottom portion in planes perpendicular to the axis of symmetry are geometrically similar. In addition, the curved top portion of the funnel-shaped nozzle encloses a substantially greater volume than the straight-walled bottom portion does, while the straight-walled bottom portion has sufficient height to maintain jetting straightness of fluid droplets ejected through the funnel-shaped nozzle.

To fabricate a funnel-shaped nozzle described in this specification, first, a uniform layer of photoresist is deposited on the dielectric coated surface of a semiconductor substrate. The dielectric can be thermally grown silicon dioxide and the substrate can be a silicon-on-insulator wafer. The layer of photoresist is patterned using UV exposure followed by resist development. The cross sectional shape of the smallest dimension of the nozzle can be similar to the opening in the resist, permitting oval, round, and arbitrary nozzle shapes. The opening in the resist is transferred into the dielectric using dry etching and the resist is stripped.

A uniform layer of photoresist is similarly patterned with an opening that has one or more sidewalls that are substantially perpendicular to the planar top surface of the semiconductor substrate and the planar top surface of the layer of photoresist. The resist opening is designed to be slightly larger, have a similar shape, and be accurately aligned to the opening in the dielectric. Then, the patterned layer of photoresist is heated in vacuum such that the photoresist material in the layer softens and reflows under the influence of surface tension of the photoresist material. As a result of the reflow, the angled corners on or between the top edge(s) of the opening become rounded and the top edge(s) transform into a single rounded edge. The radius of curvature of the rounded edge can be controlled by the reflow bake conditions. For example, the radius of curvature of the rounded edge can be equal or greater than the initial thickness of the uniform layer of photoresist deposited on the semiconductor substrate. After the desired rounded shape of the top edges is obtained, the patterned layer of photoresist is allowed to cool and re-harden, while the rounded shape of the top edges remains. After reflow, the resist layer opening at the dielectric interface remains slightly larger than the opening in the dielectric.

After formation of the patterned layer of photoresist that has the opening with a curved side surface gradually expanding toward and smoothly joined to an exposed top surface of the patterned layer of photoresist, the forming of a funnel-shaped recess in the semiconductor substrate can begin.

A straight-walled recess is etched into the semiconductor substrate through an opening defined by the dielectric layer, not an opening formed by the reflowed layer of photoresist. The straight-walled recess can be formed, for example, using a Bosch process. The high-selectivity etching of the straight-walled recess leaves the layer of photoresist substantially un-etched. The depth of the recess can be a few microns less than the final designed length of the funnel-shaped nozzle. Once the straight-walled recess is formed into the semiconductor substrate, an isotropic dry etching process is used to transform the straight-walled recess into the funnel-shaped recess. Specifically, the etchant used in the dry etching should have comparable (e.g., substantially equal) etch rates for the photoresist, the dielectric, and the material of the semiconductor substrate (e.g., a Si<100> wafer). During dry etching, the etchant gradually deepens the straight-walled recess to form a straight-walled bottom portion of the funnel-shaped recess. At the same time, dry etching expands the sidewall of the part of the bore near the dielectric layer into a curved side surface that levels off into the horizontal surface of the semiconductor substrate. This funnel converges toward and smoothly transitions into the straight-walled bottom portion of the funnel-shaped recess. The funnel-shaped recess can be opened at the bottom by removing the un-etched substrate from below.

In one aspect, a process for making a nozzle, the process includes forming a first opening having a first width in a top layer of a substrate, forming a patterned layer of photoresist on the top surface of the substrate, the patterned layer of photoresist including a second opening, the second opening having a second width larger than the first width. The method includes reflowing the patterned layer of photoresist to form curved side surfaces terminating on the top layer of the substrate, etching a second layer of the substrate through the first opening in the top layer of the substrate to form a straight-walled recess, the straight-walled recess having the first width, a bottom surface, and a side surface substantially perpendicular to the top surface of the semiconductor substrate.

After the straight-walled recess is formed, the method involves dry etching the curved side surface of the patterned layer of photoresist, the top layer of the substrate, and the second layer of the substrate, where the dry etching i) transforms the straight-walled recess into a funnel-shaped recess, the funnel-shaped recess includes a curved sidewall gradually smoothly joining a straight-walled lower portion of the recess or terminating on the bottom surface, ii) enlarges a portion of the straight-walled recess to a third width greater than the first width, and iii) enlarges the first opening in the top layer to a fourth width greater than the third width.

Implementations can include one or more of the following features. The second opening can be larger than the first opening by about 1 μm. A stepper can be used to accurately align the patterned layer of photoresist on the top surface of the substrate having the first opening. The first opening can be formed by etching with a thin, non-reflowed resist. The substrate can be semiconductor substrate, the first layer can be an oxide layer having a high selectivity for a Bosch etching process. A portion of the fourth width can be 40 μm larger than the first width. Reflowing the patterned layer of photoresist can include softening the patterned layer of photoresist by heat until a top edge of the second opening becomes rounded under the influence of surface tension. After the softening by heat, the patterned layer of photoresist can be re-hardened while the top edge of the second opening remains rounded.

The patterned layer of photoresist deposited on the top surface of the substrate can be at least 10 microns in thickness. Softening the patterned layer of photoresist by heat further can include heating the patterned layer of photoresist having the second opening formed therein in a vacuum environment until photoresist material in the patterned layer of photoresist reflows under the influence of surface tension. Heating the patterned layer of photoresist can include heating the patterned layer of photoresist to a temperature of 160-250 degrees Celsius. Re-hardening the patterned layer of photoresist can include cooling the patterned layer of photoresist while the top edge of the second opening remains rounded. A top opening of the curved top portion can be is at least four times as wide as a bottom opening of the curved top portion. Etching the top surface of the substrate to form the straight-walled recess can include etching the top surface of the semiconductor substrate through the opening in the patterned layer of photoresist using a Bosch process.

The dry etching to form the funnel-shaped recess can have substantially the same etch rates for the patterned layer of photoresist and the semiconductor substrate. The dry etching to form the funnel-shaped recess can include dry etching using a $CF_4/CHF_3$ gas mixture. The first opening in the patterned layer of photoresist can have a circular cross-sectional shape in a plane parallel to the exposed top surface of the patterned layer of photoresist. The funnel-shaped recess can have a circular cross-sectional shape in a plane parallel to the top surface of the substrate. The plurality of nozzles can have a standard deviation in the nozzle width of less than 0.15 microns. The recess can extend all the way through the top layer.

Particular implementations can include none, one or more of the following advantages.

The funnel-shaped nozzle has a curved top portion whose volume is sufficiently large to hold several droplets (e.g., 3 or 4 droplets) of fluid. The side surface of the funnel-shaped nozzle is streamlined and free of discontinuities in the fluid ejection direction. Compared to a straight-walled nozzle (e.g., a cylindrical nozzle) of the same depth and drop size, the side surface of the funnel-shaped nozzle generates less friction on the fluid during fluid ejection, and prevents the nozzle from taking in air when the droplet breaks free from the nozzle. Reducing the fluid friction not only improves the stability and uniformity in droplet formation, but also allows higher jetting frequencies, lower driving voltages, and/or higher power efficiencies. Having a single narrow portion of the nozzle can cause the meniscus to pin in a stable location. Preventing air from entering the nozzle can help prevent trapped air bubbles from blocking the nozzle or other parts of the flow path.

Although a nozzle having tapered, flat sidewalls (e.g., a nozzle of an inverted pyramid shape) may also realize some advantages (e.g., reduced friction) over a cylindrical nozzle, the sharp angled edges at the bottom opening of tapered nozzle still pose more drag on the droplets than the funnel-shaped nozzle does. In addition, the angled edges and rectangular (or square) shape of the tapered nozzle opening also affect the straightness of the drop direction in an unpredictable way, leading to deterioration of printing quality. In the funnel-shaped nozzle described in this specification, the straight-walled bottom portion accounts for none or a small portion of the overall nozzle depth, thus, the straight-walled bottom portion ensures jetting straightness without causing too much friction on fluid being expelled. Thus, the funnel-shaped nozzle can help achieve better jetting straightness, higher firing frequencies, higher power efficiencies, lower driving voltages, and/or uniformity of drop shape and locations.

Although funnel-shaped nozzles having a curved side surface may be formed using electroforming or micro-molding techniques, such techniques are limited to metal or plastic materials and may not be workable in forming nozzles in semiconductor substrates. In addition, the electroforming or micro-molding techniques tend to have lower precision and cannot achieve the size, geometry, and pitch requirements needed for high-resolution printing. The semiconductor processing techniques can be used to produce large arrays of nozzles that are highly compact and uniform, and can meet the size, geometry, and pitch requirements needed for high-resolution printing. For example, nozzles can be as small as 5 microns, the nozzle-to-nozzle pitch accuracy can be about 0.5 microns or less (e.g. 0.25 microns), the first nozzle-to-last nozzle pitch accuracy can be about 1 micron, and the nozzle size accuracy can be at least 0.6 microns.

The methods and systems disclosed herein reduces variations in the diameter of the funnel bore. Reduced nozzle size variation can lessen (e.g., eliminate) print line width variation, and reduce the need to scrap nozzle plates that contain nozzles with too much variation. Since size variation is less significant in straight bore holes etched into silicon wafers using non-reflowed resist, the methods disclosed herein uses edges of an opening in an oxide layer, instead of an opening in the reflowed photoresist to define the dimensions of a Bosch-etched straight-wall recess that is a precursor of the funnel-shaped nozzle. By making the oxide opening slightly smaller than the photoresist opening, the oxide, and not the reflowed resist, allows the opening to be made with thin, non-reflowed resist, and the oxide opening is thus more precise than the reflowed resist opening. The oxide also has a high selectivity for the Bosch etch. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Fluid drop ejection can be implemented with a substrate, for example, a microelectromechanical system (MEMS), including a fluid flow body, a membrane, and a nozzle layer. The flow path body has a fluid flow path formed therein, which can include a fluid filled passage, a fluid pumping chamber, a descender, and a nozzle having an outlet. An actuator can be located on a surface of the membrane opposite the flow path body and proximate to the fluid pumping chamber. When the actuator is actuated, the actuator imparts a pressure pulse to the fluid pumping chamber to cause ejection of a droplet of fluid through the outlet of the nozzle. Frequently, the flow path body includes multiple fluid flow paths and nozzles, such as a densely packed array of identical nozzles with their respective associated flow paths. A fluid droplet ejection system can include the substrate and a source of fluid for the substrate. A fluid reservoir can be fluidically connected to the substrate for supplying fluid for ejection. The fluid can be, for example, a chemical compound, a biological substance, or ink.

Figure 1:
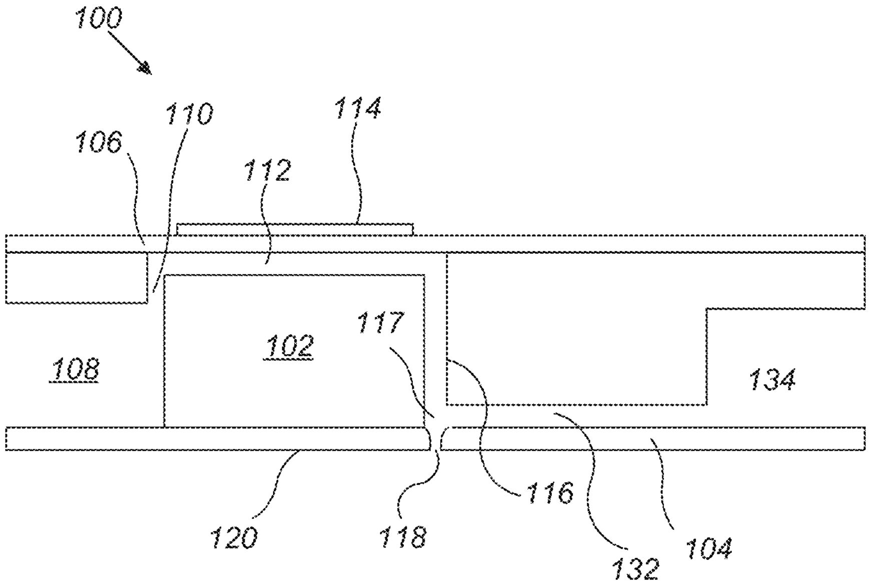
FIG. 1 shows a cross-sectional side view of an apparatus for fluid droplet ejection.

Referring to FIG. 1, a cross-sectional schematic diagram of a portion of a microelectromechanical device, such as a printhead in one implementation is shown. The printhead includes a substrate 100. The substrate 100 includes a fluid path body 102, a nozzle layer 104, and a membrane 106. The nozzle layer 104 is made of a semiconductor material, such as silicon. A fluid reservoir supplies a fluid to a fluid fill passage 108. The fluid fill passage 108 is fluidically connected to an ascender 110. The ascender 110 is fluidically connected to a fluid pumping chamber 112. The fluid pumping chamber 112 is in close proximity to an actuator 114. The actuator 114 can include a piezoelectric material, such as lead zirconium titanate (PZT), sandwiched between a drive electrode and a ground electrode. An electrical voltage can be applied between the drive electrode and the ground electrode of the actuator 114 to apply a voltage to the actuator and thereby actuate the actuator. A membrane 106 is between the actuator 114 and the fluid pumping chamber 112. An adhesive layer (not shown) can secure the actuator 114 to the membrane 106.

A nozzle layer 104 is secured to a bottom surface of the fluid path body 102 and can have a thickness between about 15 and 100 microns. A nozzle 117 having an outlet 118 is formed in an outer surface 120 of the nozzle layer 104. The fluid pumping chamber 112 is fluidically connected to a descender 116, which is fluidically connected to the nozzle 117.

While FIG. 1 shows various passages, such as a fluid fill passage, pumping chamber, and descender, these components may not all be in a common plane. In some implementations, two or more of the fluid path body, the nozzle layer, and the membrane may be formed as a unitary body. In addition, the relative dimensions of the components may vary, and the dimensions of some components have been exaggerated in FIG. 1 for illustrative purposes.

Figure 2A:
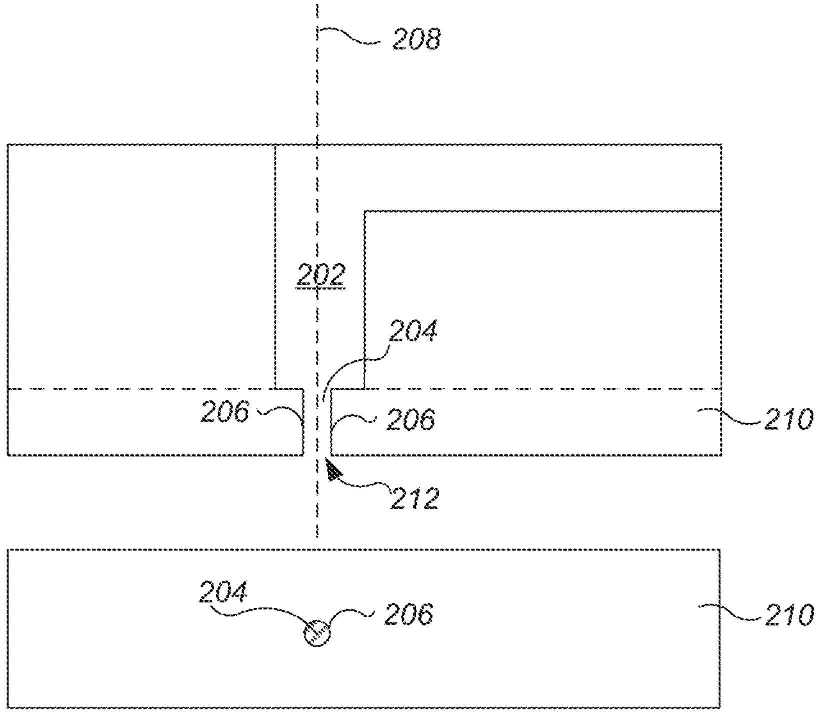
FIG. 2A Prior Art
FIG. 2A is a cross-sectional side view of a print head flow path with a nozzle having a single straight sidewall (i.e., a cylindrical nozzle), and a top plan view of the nozzle.
Figure 2B:
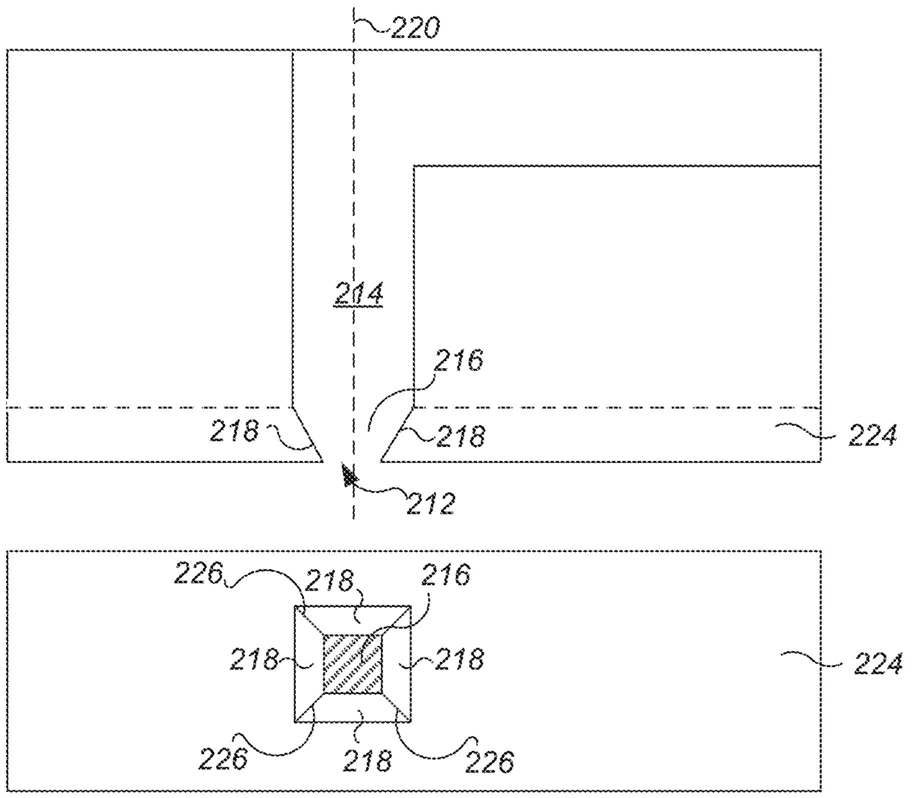
FIG. 2B Prior Art
FIG. 2B is a cross-sectional side view of a print head flow path with a nozzle having tapered, flat sidewalls, and a top plan view of the nozzle.
Figure 2C:
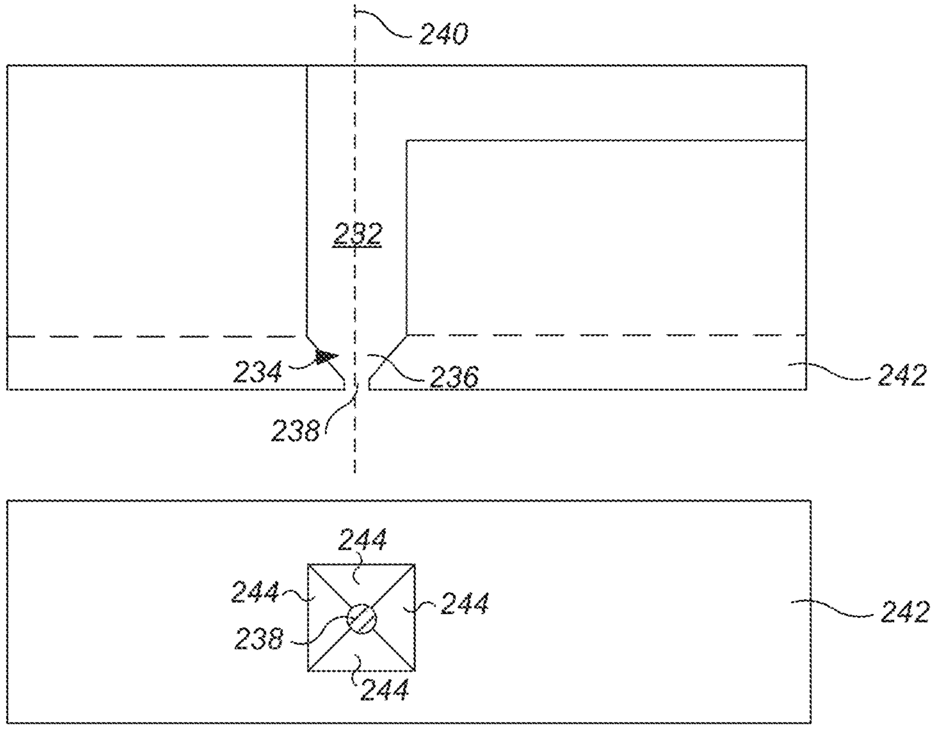
FIG. 2C Prior Art
FIG. 2C is a cross-sectional side view of a print head flow path with a nozzle having a tapered top portion abruptly joined to a straight-walled bottom portion, and a top plan view of the nozzle.

The design of the flow path, the nozzle dimensions and shape in particular, affect printing quality, printing resolution, as well, energy efficiencies of the printing device. FIGS. 2A-2C show a number of conventional nozzle shapes.

For example, FIG. 2A shows a print head flow path 202 with a straight nozzle 204. The straight nozzle 204 has a straight sidewall 206. The top portion of FIG. 2A shows a cross-sectional side view of the flow path 202 and the nozzle 204 in a plane passing through a central axis 208 of the nozzle 204. The central axis 208 is an axis that passes through the geometric center of all the horizontal cross-sections of the nozzle 204. In this specification, the central axis 208 of the nozzle is sometimes referred to as the axis of symmetry of the nozzle in cases where the geometric center of each horizontal cross section is also the center of symmetry of the horizontal cross section. As indicated in the top portion of FIG. 2A, in a plane including the central axis 208, the profile of the sidewall 206 are straight lines parallel to the central axis 208. In this example, the nozzle 204 is a circular right cylinder, and has a single straight sidewall. In other examples, the nozzle can be a square right cylinder, and has four straight, flat side surfaces.

As shown in FIG. 2A, the nozzle 204 is formed in a nozzle layer 210. The nozzle 204 has the same cross-sectional shapes and sizes in planes perpendicular to the central axis 208 of the nozzle 204. The lower portion of FIG. 2A shows the top plan view of the nozzle layer 210. In this example, the nozzle 204 has a circular cross-sectional shape in the planes perpendicular to the central axis 208 of the nozzle 204. In various implementations, the nozzle 204 can have other cross-sectional shapes, such as oval, square, rectangular, or other regular polygonal shapes.

A nozzle having straight sidewall(s) is relatively easy to fabricate. The straight sidewall(s) of the nozzle can help maintain jetting straightness and making the landing positions of ink droplets ejected from the nozzle more predictable. However, to ensure a sufficient drop size, the height of the straight-walled nozzle needs to be rather large (e.g., tens of microns or more). The large vertical dimension of the straight-walled nozzle creates a significant amount of friction on the fluid inside the nozzle, when the fluid is ejected from the nozzle as a droplet. The higher flow resistance created in the straight-walled nozzle results in a lower jetting frequency, and/or a higher driving voltage, which can further lead to lower printing speed, lower resolution, lower power efficiency, and/or lower device life.

Another drawback of the straight-walled nozzle is that, when a droplet breaks free from the outlet (e.g., outlet 212) of the nozzle, air can be sucked into the nozzle from the outlet opening of the nozzle and be trapped inside the nozzle or other parts of the flow path. The air trapped inside the nozzle can block ink flow or deflect fluid droplets that are being ejected from their desired trajectory.

FIG. 2B shows a print head flow path 214 with a nozzle 216 having tapered, flat sidewalls 218. The upper portion of FIG. 2B shows a cross-sectional side view of the print head flow path 214 in a plane containing the central axis 220 of the nozzle 216. In the plane containing the central axis 220, the profile of the nozzle 216 are straight lines converging toward the central axis 220 going from the top opening of the nozzle 216 to the bottom opening (or outlet 212) of the nozzle 216. The profile of the nozzle 216 can be formed by multiple planes that converge toward the center axis 220.

The nozzle 216 is formed in a nozzle layer 224, and the cross-sectional shapes of the nozzle 216 in planes perpendicular to the central axis 220 are squares of continuously decreasing sizes. The nozzle 216 have four flat sidewalls each slanted from an edge of the top opening of the nozzle 216 to a corresponding edge of the bottom opening of the nozzle 216. The lower portion of FIG. 2B shows a top plan view of the nozzle layer 224. As shown in the lower portion of FIG. 2B, each sidewall 218 of the nozzle 216 is a flat surface that intersects with each of two adjacent flat sidewalls 218 along an edge 226. Each edge 226 is an angled edge, rather than a rounded edge.

As shown in the lower portion of FIG. 2B, the lower opening of the nozzle 216 is a smaller square opening while the upper opening of the nozzle 216 is a larger square opening. The central axis 220 passes through the geometric centers of both the upper opening and the lower opening of the nozzle 216. The tapered sidewalls 218 of the nozzle 216 provides reduced friction on the fluid passing through the nozzle as compared to the straight-walled nozzle 204 shown in FIG. 2A. The tapered shape of the nozzle 216 also reduces the amount of air intake occurring during the breakoff of droplets at the nozzle outlet 212.

The tapered nozzle 216 shown in FIG. 2B can be formed in a semiconductor nozzle layer 224 (e.g., a silicon nozzle layer) using KOH etching. However, the shape of the tapered nozzle 216 is dictated by the crystal planes existing in the semiconductor nozzle layer 224. When the nozzle 216 is created by KOH etching, the side surfaces of the nozzle 216 are formed along the <111> crystal planes of the semiconductor nozzle layer 224. Therefore, the angle between each slanted side surface 218 and the central axis 220 has a fixed value of about 35 degrees.

Although the tapered nozzle 216 shown in FIG. 2B offers some improvement over the straight-walled nozzle 204 shown in FIG. 2A in terms of lowered flow resistance and reduced air uptake, there is very little flexibility in terms of changing the shape of the nozzle opening or the angle of the tapered sidewalls. The square corners of the nozzle outlet can sometimes cause satellites (tiny secondary droplets created in addition to a main droplet during droplet ejection) to form. In addition, the sharp discontinuities between the flat sidewalls 218 and the horizontal bottom surface of the nozzle layer 224 at the edges of the nozzle outlet 212 also cause additional drag on the droplets, causing reduced jetting speed and frequency.

FIG. 2C shows another nozzle configuration that combines a tapered section as shown in FIG. 2B with a straight section as shown in FIG. 2A. Due to the limitation posed by the KOH etching techniques, the straight bottom portion and the tapered top portion are formed by etching from two sides of the substrate. However, the two-side etching can lead to difficult alignment issues. Otherwise, specially designed steps have to be taken to form the straight bottom portion from the same side as the tapered portion, e.g., as described in U.S. Patent Publication 2011-0181664, incorporated by reference.

The top portion of FIG. 2C shows a cross-sectional side view of a print head flow path 232 with a nozzle 234 having a tapered top portion 236 abruptly joined to a straight bottom portion 238. The cross-sectional side view shown in FIG. 2C is in a plane containing the central axis 240 of the nozzle 234. In the plane containing the central axis 240, the profile of the tapered top portion 236 consists of straight lines converging from the top opening of the nozzle 234 toward the intersection between the tapered top portion 236 and the straight-walled bottom portion 238. In the plane containing the central axis 240, the profile of the straight-walled bottom portion 238 consists of straight lines parallel to the central axis 240. This profile can be provided by a cylinder that is co-axial with the central axis 240. The intersection between the tapered top portion 236 and the straight-walled bottom portion 238 is not smooth and has one or more discontinuities or angled edges in the vertical direction (i.e., the fluid ejection direction in this example).

In this example, the cross-sectional shapes of the tapered top portion 236 in planes perpendicular to the central axis of the nozzle 234 are square, while the cross-sectional shapes of the bottom portion 238 in planes perpendicular to the central axis of the nozzle 234 are circular. Therefore, the tapered top portion 236 has four flat side surfaces 244 each slanted from an edge of the top opening of the tapered top portion 236 to a corresponding edge of the intersection between the top portion 236 and the bottom portion 238. Although the straight bottom portion 238 shown in FIG. 2C has a circular cross-section, the straight bottom portion can also have a square cross-section or cross-sections of other shapes.

The nozzle 234 is formed in the nozzle layer 242. The lower portion of FIG. 2C shows the top plan view of the nozzle 234. In the top plan view, the lower opening of the straight-walled bottom portion 238 is circular, and the top opening of the tapered top portion 236 is square, and the intersection between the straight bottom portion 238 and the tapered top portion 236 is an intersection between a cylindrical hole and an inverted pyramid hole. Due to the mismatch between the cross-sectional shapes between the top and bottom portions, the edges of the intersection include curves and sharp discontinuities. These discontinuities also cause fluid friction and instability in drop formation. Even if the cross-sectional shapes of the top portion 236 and the bottom portion 238 are both square, there are still discontinuities at the intersection between the two portions in the fluid ejection direction. The square-shaped nozzle opening is also less ideal than a circular nozzle outlet for other reasons set forth with respect to FIG. 2B, for example.

In this specification, a funnel-shaped nozzle having a curved top portion smoothly joined to a straight-walled bottom portion formed in a semiconductor nozzle layer (e.g. silicon nozzle layer) is disclosed. The curved top portion of the funnel-shaped nozzle differs from a tapered top portion shown in FIG. 2C in that the profile of the side surface of the curved top portion in a plane containing the central axis of the nozzle consists of curved rather than straight lines. In addition, the profile of the curved top portion converges toward the straight bottom portion and is smoothly joined to the straight-walled bottom portion, rather than bending at an abrupt angle at the intersection between the curved top portion and the straight-walled bottom portion.

In addition, in some implementations, the transition from the horizontal top surface of the nozzle layer to the curved side surface of the funnel-shaped nozzle is also smooth rather than abrupt. In addition, the horizontal cross-sectional shapes of the funnel-shaped nozzle in planes perpendicular to the central axis of the nozzle are geometrically similar and concentric for the entire depth of the nozzle. Therefore, there is no jagged intersection between the curved top portion and the straight-walled bottom portion of the funnel-shaped nozzle. The funnel-shaped nozzle described in this specification offer many advantages over the conventional nozzle shapes described with respect to FIGS. 2A-2C, for example.

Figure 3A:
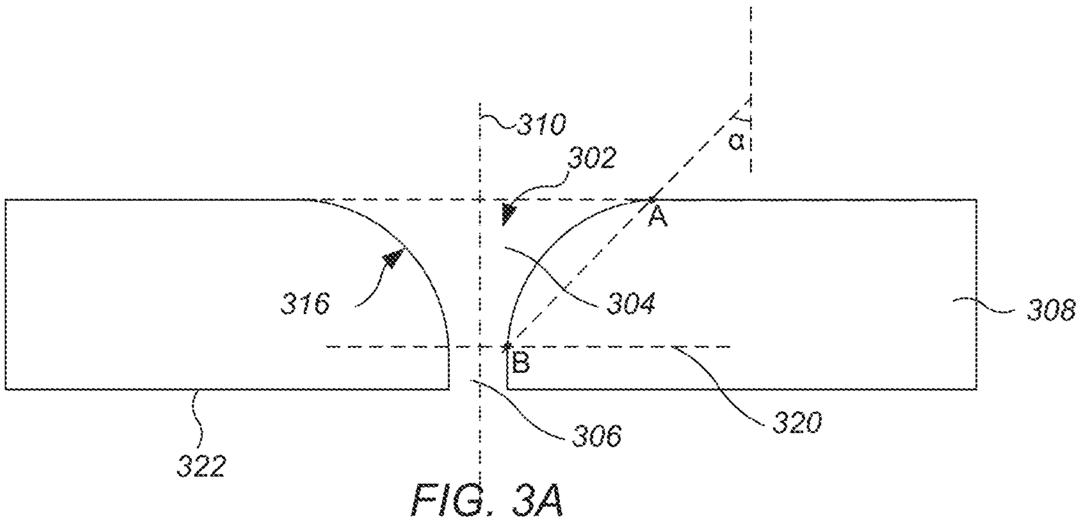
FIG. 3A is a cross-sectional side view of a funnel-shaped nozzle having a curved top portion smoothly joined to a straight-walled bottom portion.

FIG. 3A is a cross-sectional side view of a funnel-shaped nozzle 302 having a curved top portion 304 smoothly joined to a straight-walled bottom portion 306. In the straight walled bottom portion 306, the sides of the nozzle are parallel, and are perpendicular to the outer surface 322 of the nozzle layer. The straight-walled bottom portion 306 can be a cylindrical passage (i.e., the walls are straight up/down rather than laterally). Depending on the process parameters, the straight walled portion 306 can be avoided and the funnel portion 316 can continue to the surface 322. The funnel-shaped nozzle 302 is a funnel-shaped through hole formed in a planar semiconductor nozzle layer 308. The intersection between the curved top portion 304 and the straight-walled bottom portion 306, whose location is indicated by the dotted line 320 in FIG. 3A, is smooth and substantially free of any discontinuities and any surfaces perpendicular to the central axis 310 of the nozzle 302.

As shown in FIG. 3A, the height of the curved top portion 304 is substantially larger than the height of the straight-walled bottom portion 306. However, the straight-walled bottom portion 306 can have at least some height, e.g., 10-30% of the height of the curved top portion 304. For example, the height of the curved top portion 304 can be 40-75 microns (e.g., 40, 45, or 50 microns), while the height of the bottom portion 306 can be only 5-10 microns (e.g., 5, 7, or 10 microns). The curved top portion 304 encloses a volume much larger than the straight-walled bottom portion 306. The larger curved top portion holds most of the fluid to be ejected. In some implementations, the volume enclosed in the curved top portion 304 is the size of several droplets (e.g., 3 or 4 droplets). Each droplet can be 3-100 picoliters. The straight bottom portion 306 has a smaller volume, such as a volume less than the size of a single droplet.

The height of the straight-walled portion 306 is small enough so that it does not cause a significant amount of fluid friction, and does not cause substantial air uptake during break-off of the droplets. At the same time, the height of the straight-walled portion is large enough to maintain jetting straightness. In some implementations, the height of the straight-walled portion 306 is about 10-30% of the diameter of the nozzle outlet. For example, in FIG. 3A, the nozzle outlet has a diameter of 35 microns, and the height of the straight-walled portion is 5-10 microns (e.g., 7 microns). In some implementations, the diameter of the nozzle outlet can be 15-45 microns.

Both the curved top portion 304 and the straight-walled bottom portion 306 of the nozzle 302 serve important functions in droplet formation and ejection. The curved top portion 304 is designed to hold a sufficient volume of fluid so that when a droplet is ejected from the nozzle outlet, there is little or no void created in the nozzle to form air bubbles inside the nozzle. A bottom of the funnel can hold a smaller volume of fluid.

The funnel-shaped nozzle 302 further differs from the nozzles shown in FIGS. 2B and 2C in that the cross-sectional shape of the funnel-shaped nozzle 302 in planes perpendicular to the central axis 310 of the nozzle 302 are circular, rather than rectangular, for the entire depth of the nozzle 302. Thus, there is no discontinuity between the curved top portion 304 and the straight bottom portion 306 in the direction of fluid ejection. The streamlined profile of the funnel-shaped nozzle 302 provides even less fluid friction than the nozzles shown in FIGS. 2B and 2C. In addition, the side surface of the funnel-shaped nozzle 304 is completely smooth and free of any discontinuities or abrupt changes in the azimuthal direction as well. Therefore, the funnel-shaped nozzle 304 does not produce drag or instabilities to cause other drawbacks (e.g., satellite formation) present in the nozzles shown in FIG. 2B and FIG. 2C either.

It can be difficult to form a funnel-shape nozzle in silicon using conventional etching processes. Conventional etching processes, such as the Bosch process, form straight vertical walls, whereas and KOH etching which forms tapered, straight walls. Although isotropic etching can form curved features, like bowl-shaped features, it is not able to make curved walls in the opposite formation to make funnel-shaped features.

In addition, given the processing techniques provided in this specification, the pitch by which the curved top portion of the funnel-shaped nozzle converges from its top opening towards the straight-walled bottom portion can be varied by design, rather than fixed by the orientation of certain crystal planes. Specifically, suppose that point A is the intersection between the edge of the top opening of the curved top portion 304 and a plane containing the central axis 310, and point B is the intersection between the edge of the bottom opening of the curved top portion 304 and the same plane containing the central axis 310. Unlike the nozzle 234 shown in FIG. 2C, the angle $\alpha$ between a straight line joining the point A and point B and the central axis 310 is not a fixed angle (e.g., 35 degrees in FIG. 2C)dictated by the crystal planes of the semiconductor nozzle layer 308. Instead, the angle $\alpha$ for the funnel-shaped nozzle 304 can be designed by varying the processing parameters when making the funnel-shaped nozzle 304. In some implementations, the angle $\alpha$ for the funnel-shaped nozzle 304 can be between 30-40 degrees. In some implementations, the angle $\alpha$ for the funnel-shaped nozzle 304 can be greater than 40 degrees.

As is shown in FIG. 3A, the curved top portion 304 of the funnel-shaped nozzle 302 differ from a rounded lip resulted from a natural rounding or tapering of a recess wall created in the process of creating a cylindrical recess in a substrate.

First, the amount of tapering exhibited by the curved top portion 304 of the funnel-shaped recess 302 is much larger than any tapering that might be inherently present due to manufacturing imprecisions (e.g., over etching of substrate through a straight-walled photoresist mask). For example, the angle of tapering for the sidewall of a funnel-shaped nozzle is about 30 to 40 degrees. The vertical extent of the curved top portion 304 can be tens of microns (e.g., 50-75 microns). The width of the top opening of the curved top portion 304 can be 100 microns or more, and can be 3 or 4 times the width of the bottom opening of the curved top portion 304. In contrast, the tapering or rounding present near the top opening of a cylindrical recess due to manufacturing imperfections and/or imprecisions is typically less than 1 degree. The natural tapering or rounding also has a much smaller height and width variation (e.g., in the range of nanometers or less than 1-2 microns) than those present in the funnel-shaped nozzle described in this specification.

Figure 3B:
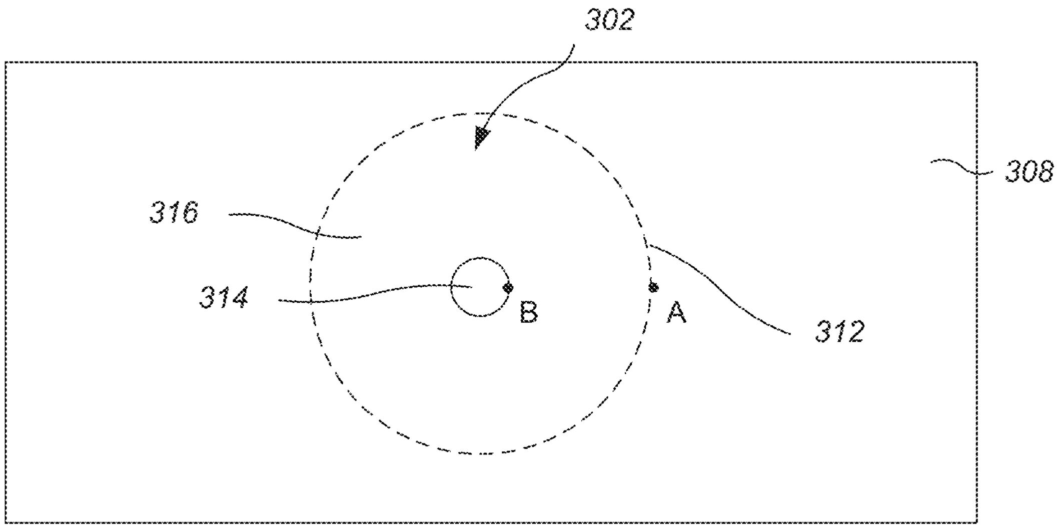
FIG. 3B is a top plan view of a funnel-shaped nozzle having a curved top portion smoothly joined to a straight-walled bottom portion, where the horizontal cross-sectional shapes of the nozzle are circular.
Figure 3C:
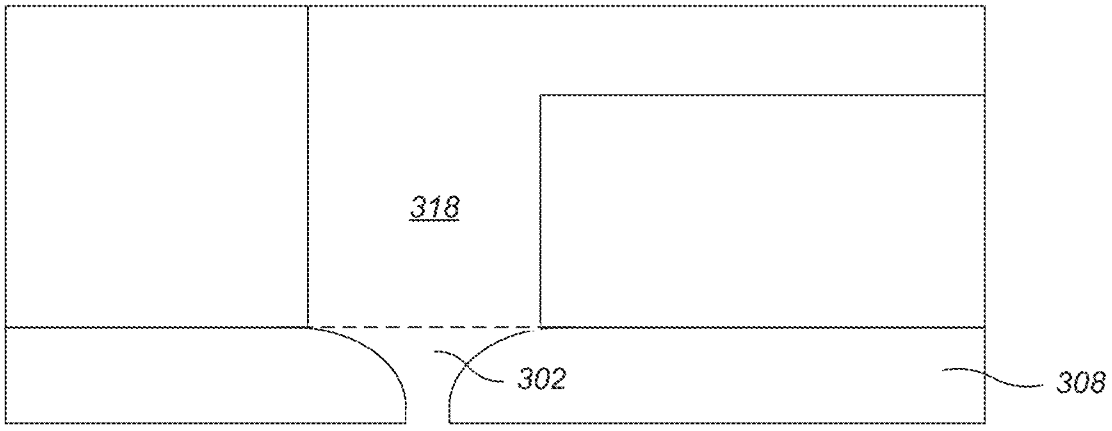
FIG. 3C is a cross-sectional side view of a print head flow path with a nozzle having a tapered top portion smoothly joined to a straight-walled bottom portion.

FIG. 3B is a top plan view of a funnel-shaped nozzle (e.g., the nozzle 302 shown in FIG. 3A). As shown in FIG. 3B, the top opening 312 and the bottom opening 314 of the funnel-shaped nozzle 302 are both circular and are concentric. There is no discontinuity at any part of the side surface 316 of the entire nozzle 302. The width of the top opening 312 is at least 3 times the width of the bottom opening 214 of the nozzle 302. In some implementations, the top opening 312 of the nozzle 302 is fluidically connected to a pumping chamber above the funnel-shaped nozzle 302, and the boundary of the pumping chamber defines the boundary of the top opening 312 of the funnel-shaped nozzle 302. FIG. 3C shows a print head flow path 318 with a funnel-shaped nozzle 302.

Although FIG. 3B shows a funnel-shaped nozzle having a circular cross-sectional shape for its entire depth, other cross-sectional shapes are possible. The cross-sectional shape of the straight-walled bottom portion of a funnel-shaped nozzle can be oval, square, rectangular, or other polygonal shapes. The curved top portion of the funnel-shaped nozzle would have a similar cross-sectional shape as the straight-walled bottom portion. However, the corners (if any) in the cross-sectional shape of the curved top portion are gradually eliminated or smoothed out as the side surface of the curved top portion extends further away from the straight-walled bottom portion toward the top opening of the curved top portion. The exact shape of the cross-sections of the curved top portion is determined by the manufacturing steps and the materials used for creating the funnel-shaped nozzles.

For example, in some implementations, the funnel-shaped nozzle having a curved top portion smoothly joined to a straight-walled bottom portion can have a square horizontal cross-sectional shape. In such implementations, the center side profile of the nozzle is the same as that shown in FIG. 3A. However, the funnel-shaped nozzle would have four converging curved side surfaces, and the intersections between adjacent curved side surfaces are four smooth curved lines converging toward the bottom outlet of the nozzle and smoothly transition into four straight parallel lines in the straight bottom portion of the nozzle. In addition, the intersections between adjacent curved side surfaces are smoothly rounded, so that the four curved side surfaces form part of a single smooth side surface in the top portion of the funnel-shaped nozzle.

A print head body can be manufactured by forming features in individual layers of semiconductor material and attaching the layers together to form the body. The flow path features that lead to the nozzles, such as the pumping chamber and ink inlet, can be etched into a substrate, as described in U.S. patent application Ser. No. 10/189,947, filed Jul. 3, 2002, using conventional semiconductor processing techniques. A nozzle layer and the flow path module together form the print head body through which ink flows and from which ink is ejected. The shape of the nozzle through which the ink flows can affect the resistance to ink flow. By creating a funnel-shaped nozzle described in this application, less flow resistance, higher jetting frequencies, lower driving voltages, and/or better jetting straightness can be achieved. The processing techniques described in this specification also allow arrays of nozzles having the desired dimensions and pitches to be made with good uniformity and efficiencies.

FIGS. 4A-4F illustrate the process for making a funnel-shaped nozzle having a curved top portion smoothly joined to a straight-walled bottom portion, for example, the funnel-shaped nozzle shown in FIGS. 3A-3C.

To form the funnel-shaped nozzle, first, a patterned layer of photoresist is formed on a top surface of a semiconductor substrate, where the patterned layer of photoresist includes an opening that has a curved side surface smoothly joined to an exposed top surface of the patterned layer of photoresist. For example, an opening around a z-axis will have a side surface that curves in both the z direction and the azimuthal direction. The shape of the opening will determine the cross-sectional shapes of the funnel-shaped nozzle in planes perpendicular to the central axis of the funnel-shaped nozzle. The size of the opening is roughly the same as the bottom opening of the funnel-shaped nozzle (e.g., 35 microns). In the example shown in FIGS. 4A-4F, the opening is circular for making a funnel-shaped nozzle having circular horizontal cross-sections throughout the entire depth of the nozzle.

Figure 4A:
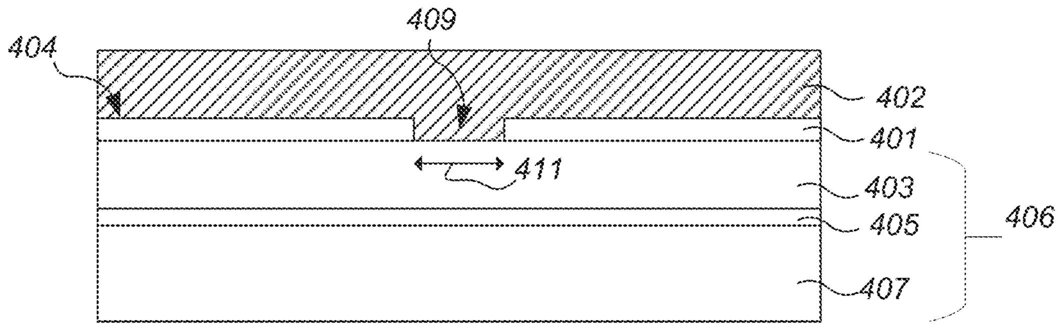
FIGS. 4A-4F illustrate the process for making a funnel-shaped nozzle having a curved top portion smoothly joined to a straight-walled bottom portion.

To form the patterned layer of photoresist, a resist-reflow process can be used. As shown in FIG. 4A, a uniform layer of photoresist 402 is applied to the planar top surface 404 of a substrate. The substrate can be a semiconductor substrate 406 (e.g., a silicon wafer). The semiconductor substrate 406 can be a substrate having one of several crystal orientations, such as a silicon <100> wafer, a silicon <110> wafer, or a silicon <111> wafer. The thickness of the layer of photoresist 402 influences the final curvature of the curved side surface of the opening in the layer of photoresist, and hence the final curvature of the curved side surface of the funnel-shaped nozzle. A thicker layer of photoresist is generally applied to obtain a larger radius of curvature for the curved side surface of the funnel-shaped nozzle.

In this example, the initial thickness of the uniform layer of photoresist 402 is about 10-11 microns (e.g., 11 microns). In some implementations, more than 11 microns of photoresist can be applied on the planar top surface 404 of the semiconductor substrate 406. Some thickness of photoresist can remain on the substrate after the processing steps to make the funnel-shaped recess of a desired depth. Examples of the photoresist that can be used include AZ 9260, AZ9245, AZ4620 made by MicroChemicals® GmbH, and other positive photoresists, for example. The thickness of the semiconductor substrate 406 is equal or greater than the desired depth for the funnel-shaped nozzle to be made. For example, the substrate 406 shown in FIG. 4A can be an SOI wafer having a silicon layer 403 of about 50 microns attached to a handle layer 407 via a thin oxide layer 405. Another thin oxide layer 401 can cover the silicon layer 403. For example, the thin oxide layer 401 can be about 1 micron. As shown in FIG. 4A, a first lithography and etch step can form an opening 409 having a first width 411 in the thin oxide layer 401. The photoresist that is used to define the opening 409 can be a thin, non-reflowed resist that is more precise. The oxide in the thin oxide layer 401 can also have a high selectivity for the Bosch etch used to form the opening 409. A selectivity between the non-reflow resist and the substrate is expected to be similar to the selectivity between the reflow resist and substrate, for example, below 100:1. In some embodiments, the first width 411 is about 1 μm smaller than the second width 413. The uniform layer of photoresist 402 also fills the opening 409. Alternatively, the substrate 406 can be a thin silicon layer attached to a handle layer by an adhesive layer or by Van der Waals force.

Figure 4B:
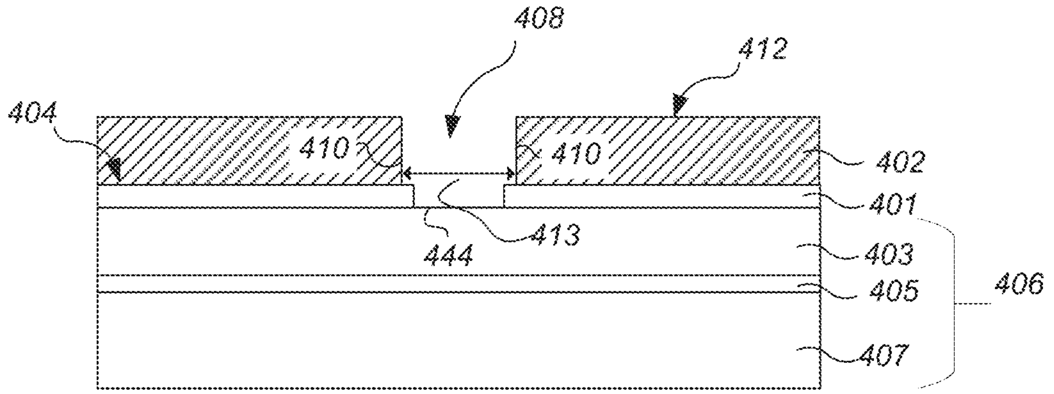

As shown in FIG. 4B, after the uniform layer of photoresist 402 is applied to the planar top surface 404 of the semiconductor substrate 406, the uniform layer of photoresist 402 is patterned, such that an initial opening 408 having a second width of 413, and one or more vertical side walls 410 are created. The second width 413 is larger than the first width 411. In some embodiments, the second width 413 can be about 1 μm larger than the first width 411. A stepper can accurately align the opening 408 with the opening 409. For example, the stepper can store information about the center of the opening 409 defined in the thin oxide layer 401 and match it with the center of the initial opening 408 during the lithography process that creates the initial opening 408. In this example, a circular opening is created in the uniform layer of photoresist 402, and the sidewall of the circular opening is a single curved surface that is perpendicular to the planar top surface 412 of the uniform layer of photoresist 402 and to the planar top surface 404 of the semiconductor substrate 406. The diameter of the opening 411 determines the diameter of the bottom opening of the funnel-shaped nozzle to be made. In this example, the diameter of the initial circular opening 411 can be about 85-95 microns (e.g., 90.5 microns). The patterning of the uniform layer of photoresist 402 can include the standard UV or light exposure under a photomask and a photoresist development process to remove the portions of the photoresist layer exposed to the light.

Figure 4C:
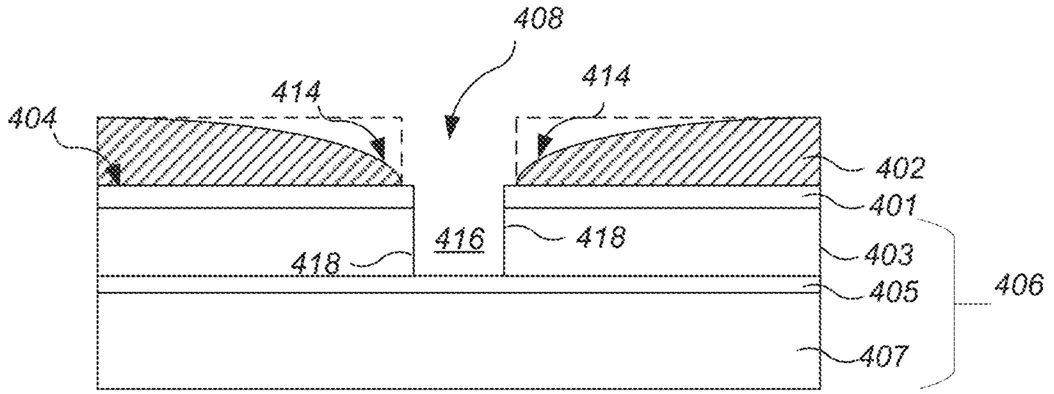

After the initial opening 408 is formed in the uniform layer of photoresist 402, the photoresist layer 402 is heated to about 160 to 250 degrees Celsius and until the photoresist material in the layer 402 is softened. When the photoresist material in the patterned layer of photoresist 402 is softened under the heat treatment, the photoresist material will start to reflow and reshape itself under the influence of surface tension of the photoresist material, particularly in regions near the top edge 414 of the opening 408. The surface tension of the photoresist material causes the surface profile of the opening 408 to pull back and become rounded. As shown in FIG. 4C, the top edge 414 of the opening 408 have become rounded under the influence of surface tension. The opening in the resist 413 doesn't change substantially from reflow.

In some implementations, the layer of photoresist 402 is heated in a vacuum environment to achieve the reflow of the photoresist layer 402. By heating the photoresist layer 402 in a vacuum environment, the surface of the photoresist layer 402 is smoother and without tiny air bubbles trapped inside of the photoresist material. This will lead to better surface smoothness in the final nozzle produced.

After the desired shape of the opening 408 is obtained, the photoresist layer 402 is cooled. The cooling can be accomplished by removing the heat source or active cooling. The cooling can also be performed in a vacuum environment to ensure better surface properties of the funnel-shaped nozzle to be made. By cooling the photoresist layer 402, the photoresist layer 402 re-hardens, and the surface profile of the opening 408 maintains its shape during the hardening process, and the top edge 414 of the opening 408 remain rounded at the end of the re-hardening process.

Once the patterned layer of photoresist 402 is hardened, etching of the substrate 406 can begin. The funnel-shaped recess is created in a two-step etching process. First, a straight-walled recess is created in a first etching process. Then, the straight-walled recess is modified during a second etching process. In the second etching process, the initially formed straight-walled recess is deepened to form the straight-walled bottom portion of the funnel-shaped recess. At the same time, the second etching process expands the initially formed straight-walled recess gradually from the top to form the curved top portion of the funnel-shaped recess.

As shown in FIG. 4C, an initial straight-walled recess 416 is created through the opening 409 in a first etching process. In other words, the edge of the oxide in the thin oxide layer 401 defines the boundary of the recess 416, not the reflowed resist 402. The first etching process can be a Bosch process, for example. In the first etching process, a straight walled recess 416 is created and has a depth slightly smaller (e.g., 1-15 microns less) than the final desired depth of the funnel-shaped recess to be made. For example, for a funnel-shaped recess having a total depth of 50-80 microns, the straight-walled recess 416 created in the first etching process can be 49-79 microns. Although tiny scalloping patterning may be present on the side profile 418 of the straight-walled recess 416, such small variations (e.g., 1 or 2 degrees) is small compared to the overall dimensions (e.g., 35 microns in width and 45-75 microns in depth) of the straight-walled recess 416.

Figure 4D:
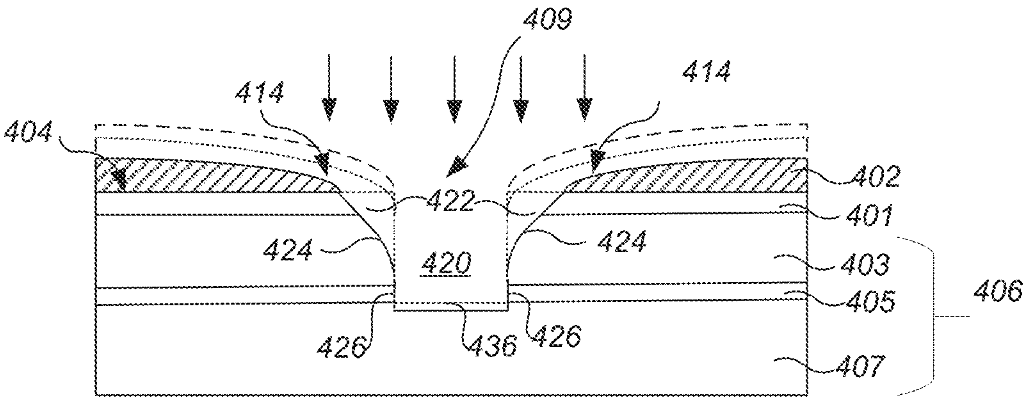

In the first etching process, the straight-walled recess 416 has substantially the same cross-sectional shape and size in a plane parallel to the top surface 404 of the semiconductor substrate 406 as the area enclosed by the opening 409. As shown in FIG. 4D, the etchant used in the first etching process removes very little of the photoresist layer 402 as compared to the device layer 403 of the semiconductor substrate 406 exposed through the opening 409 in the thin oxide layer 401. Therefore, the surface profile of the patterned layer of photoresist 402 remains substantially unchanged at the end of the first etching process. For example, the selectivity between the device layer 403 and the photoresist layer 402 during the first etching process can be 100:1.

After the initial straight-walled recess 416 is formed in the semiconductor substrate 406 through the first etching process, the second etching process can be started to transform the initial straight-walled recess 416 shown in FIG. 4C into the desired funnel-shaped recess 420 shown in FIG. 4D.

As shown in FIG. 4D, the semiconductor substrate 406 and the patterned layer of photoresist 402 are exposed to dry etching from the vertical direction (e.g., the direction perpendicular to the planar top surface 404 of the substrate 406 in FIG. 4D). The etchant used in the dry etching process can have comparable etch rates for both the photoresist and for the semiconductor substrate 406. For example, the selectivity of the dry etching between the photoresist and the semiconductor substrate can be 1:1. In some implementations, the dry etching is performed using a $CF_4/CHF_3$ and $O_2$ gas mixture at high platen power, e.g., greater than 400 W.

During the dry etching, as the etching process continues, the surface profile of the photoresist layer 402 recedes in the vertical direction under the bombardment of the etchant. Due to the curved profile 414 at the top edge of the opening 408 in the photoresist layer 402, the surface of the thin oxide layer 401 under the thinnest portion of the photoresist layer 402 gets exposed to the etchant first, as compared to other parts of the substrate surface underneath of the photoresist layer 402. In other words, the thin oxide layer 401 is etched. The portions of the semiconductor surface exposed to the etchant also are gradually etched away. As shown in FIG. 4D, the dotted lines represent the surface profiles 414 of the photoresist layer 402 and the semiconductor substrate 406 receding gradually under the bombardment of the etchant.

As shown in FIG. 4D, the regions 422 below the edge of the opening 409 in the thin oxide layer 401 are etched, and the surface of the device layer 403 are expanded in the lateral direction. An expansion of the side surface 418 of the recess 416 becomes the curved side surface 424 of the curved top portion of the funnel-shaped recess 420 formed in the semiconductor substrate 406.

As dry etching continues to expand the side surface 418 of the recess 416 in the lateral direction, the dry etching also deepens the recess 416 in the vertical direction. The deepening of the recess 416 creates the straight-walled bottom portion of the funnel-shaped recess 420. The additional amount of deepening creates a straight-walled portion that is a few microns deep. The side surface 426 of the straight-walled bottom portion is perpendicular to the planar top surface 404 of the semiconductor substrate 406. Since the amount of lateral expansion of the side surface 424 of the recess 420 gradually decreases from top to bottom, the curved side surface 424 of the curved top portion transitions smoothly into the vertical side surface 426 of the straight-walled bottom portion. The boundary of the top opening of the funnel-shaped recess 420 is defined by the edge starting from which the photoresist meets the surface of the thin oxide layer 401.

The dry etching can be timed and stopped as soon as the desired depth of the funnel-shaped recess 420 is reached. Alternatively, the dry etching is timed and stopped as soon as the desired surface profile for the curved portion of the funnel-shaped recess 420 is obtained.

In some implementations, if the semiconductor substrate is of the desired thickness of the nozzle layer, the dry etching can be continued until the etching goes through the entire thickness of the semiconductor substrate, and the funnel-shaped nozzle is formed completely. In some implementations, the semiconductor substrate can be etched, ground and/or polished from the backside until the funnel-shaped recess is opened from the backside to form the funnel-shaped nozzle.

Figure 4E:
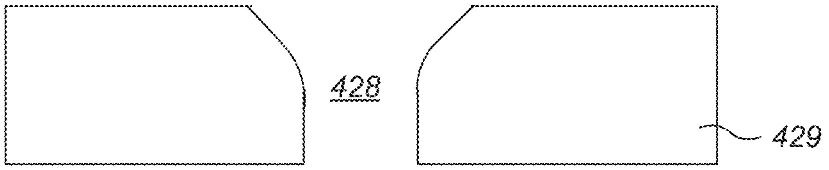
Figure 4F:
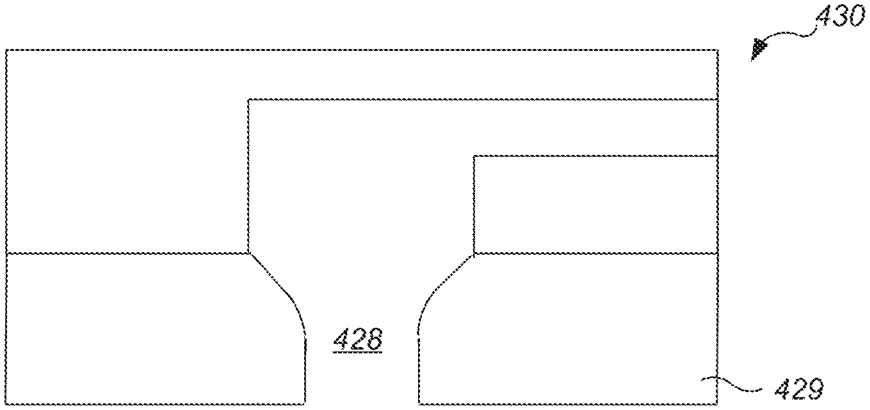

The photoresist 402 is removed, and FIG. 4E shows a completed funnel-shaped recess 428 that has been opened at the bottom. After the funnel-shaped nozzle 428 is formed, the nozzle layer 429 can be attached to other layers of a fluid ejection unit, such as a fluid ejection unit 430 shown in FIG. 4F. In some implementations, the funnel-shaped nozzle 428 is one of an array of identical funnel-shaped nozzles, and each of the arrays of identical funnel-shaped nozzle belongs to an independently controllable fluid ejection unit 430. In some implementations, a fluid ejection unit includes a piezoelectric actuator assembly supported on the top surface of the semiconductor substrate 406 and including a flexible membrane sealing a pumping chamber fluidly connected to the funnel-shaped nozzle 428. Each actuation of the flexible membrane is operable to eject a fluid droplet through the straight-walled bottom portion of the funnel-shaped nozzle 428, and a volume enclosed by the curved top portion is three or four times a size of the fluid droplet.

Figure 5A:
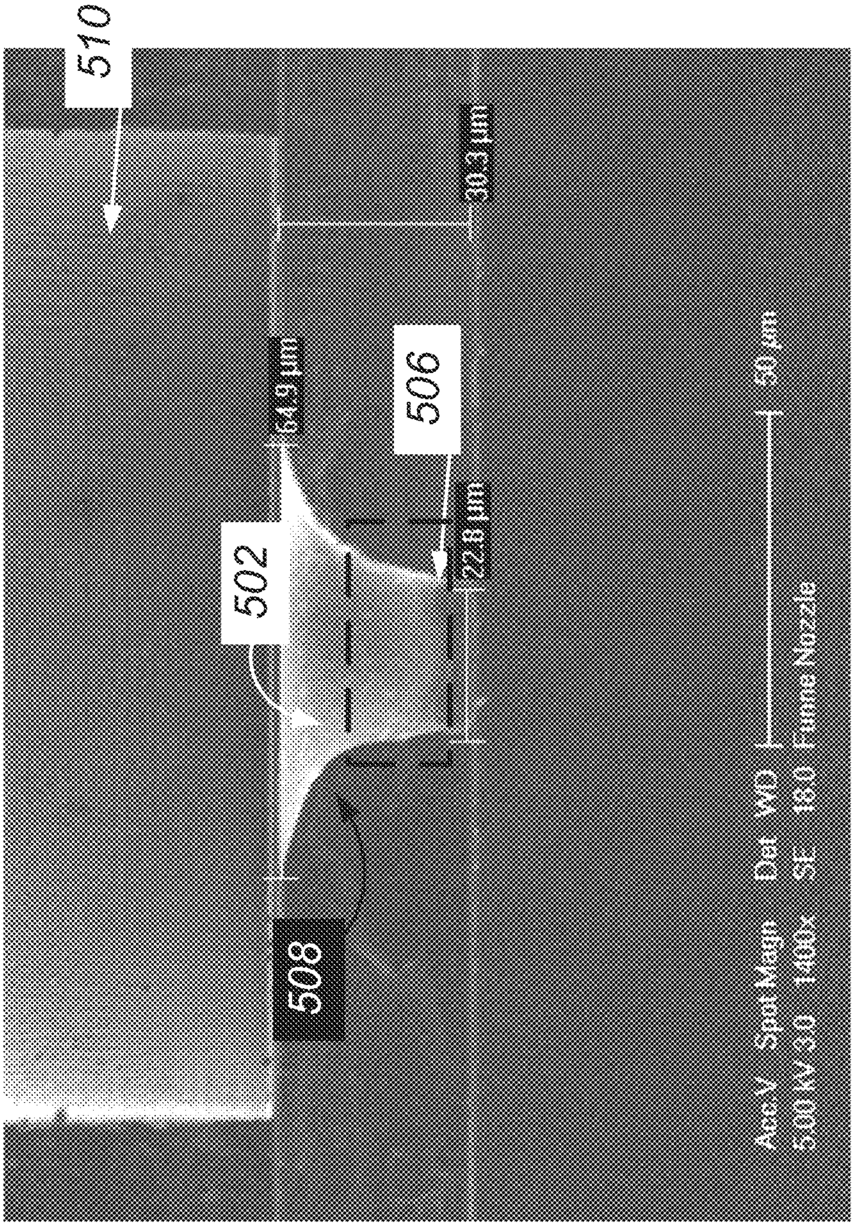
FIGS. 5A and 5B show images of a funnel-shaped recess made using the process shown in FIGS. 4A-4F.
Figure 5B:
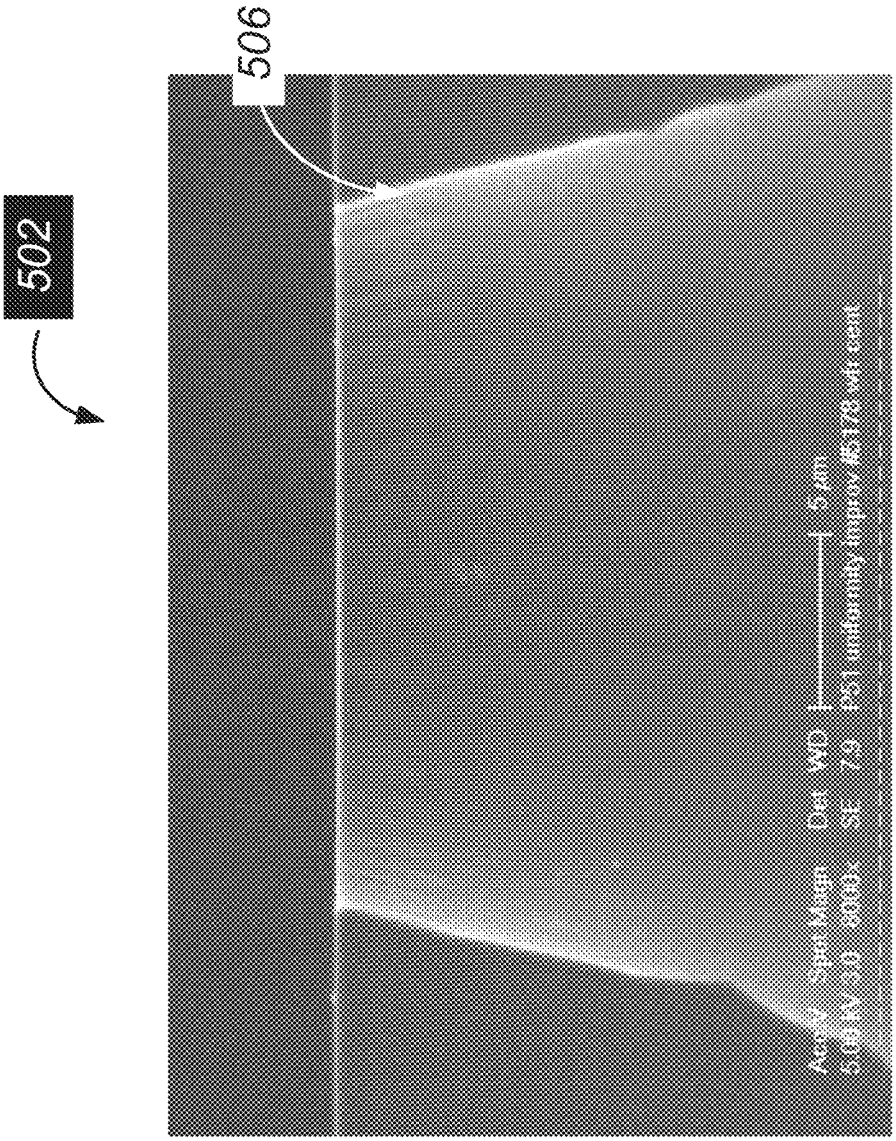

FIGS. 5A and 5B shows images of two funnel-shaped recesses (e.g., recess 502 and recess 504) made using the process shown in FIGS. 4A-4F.

The dimensions of the funnel-shaped recess may be different in different implementations. As shown in FIG. 5A, a bottom portion 506 of the funnel-shaped recess 502 has a depth of about 2-5 microns, while the curved top portion 508 of the funnel-shaped recess 502 has a depth of about 25-28 microns. When creating a funnel-shaped nozzle out of this funnel-shaped recess 502, the substrate can be ground and polished from the bottom, such that the straight-walled portion 506 has the desired depth. As shown in FIG. 5A, the diameter of the straight-walled bottom portion 506 is roughly uniform (with a variation of less than ~0.5 microns for a 20 micron diameter) in planes perpendicular to the central axis of the recess 502. The bottom opening of the curved top portion 508 is smoothly joined to the top opening of the straight-walled bottom portion 506. The diameter of the top opening of the recess 502 is in the range of 96 microns, approximately 5 times the diameter of the straight-walled bottom portion 506. The pitch by which the curved top portion 508 expands from the bottom to the top can be defined by the width of the curved top portion 508 at half height of the curved top portion 508. In this example, the width at half height of the curved top portion is about 27 microns. A descender 510 is positioned above the recess 502.

The portion of the funnel-shaped recess 502 within the dotted rectangular box region is shown in FIG. 5B. The image in FIG. 5B is rotated by 180°, and at higher magnification, the recess 502 actually does not have a straight-walled portion.

Figure 6A:
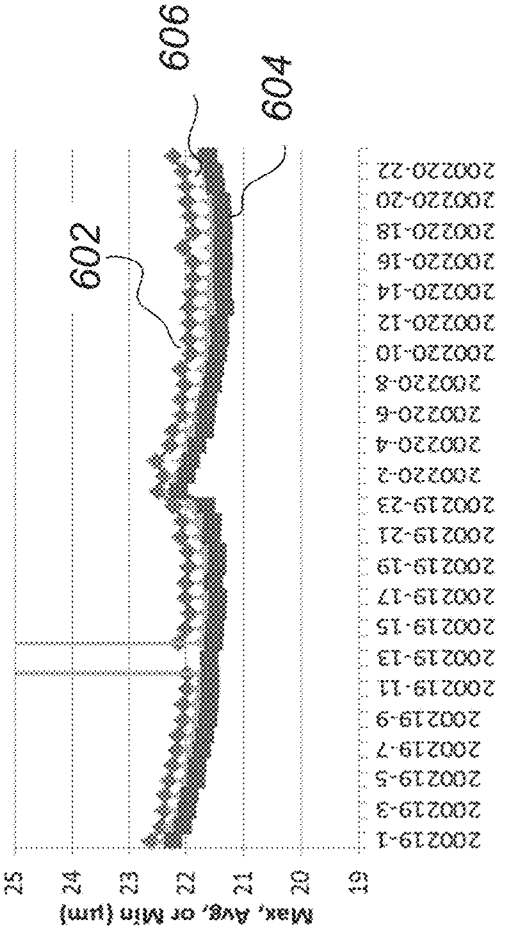
FIGS. 6A and 6B compare the maximum, minimum, and average nozzle sizes of nozzles made using the process shown in FIGS. 4A-4F, and another process.
Figure 6B:
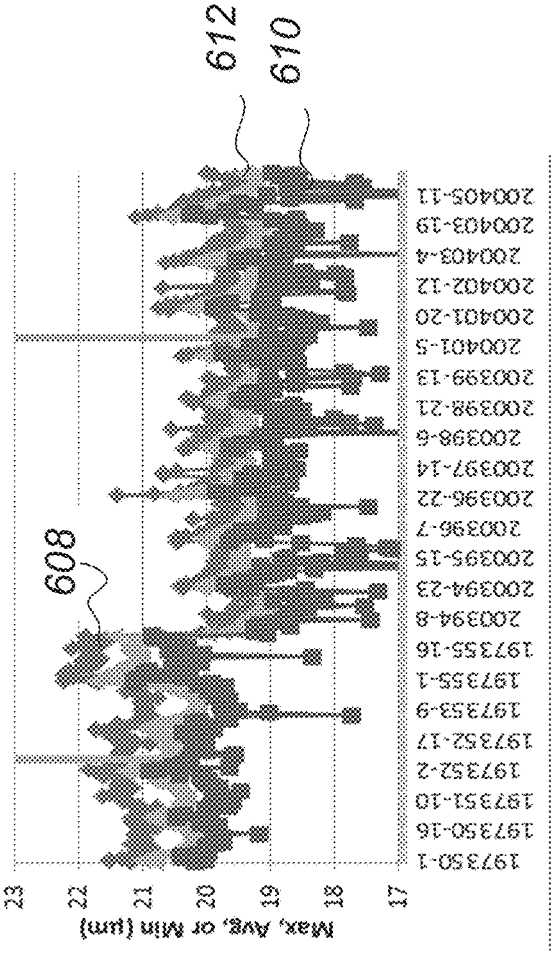

FIG. 6A shows plots of maximum, minimum, and average funnel nozzles sizes fabricated on two wafers using the process outlined in FIGS. 4A-4F. As a comparison, FIG. 6B shows plots of maximum, minimum, and average funnel nozzles sizes fabricated on fifteen wafers using another process where the reflow photoresist has an initial opening that is smaller than an opening defined in the thin oxide layer. Using the other process, the edges of the reflow resist defines the nozzles boundary of the straight-walled recess formed during the first etching process shown in FIG. 4C. Plot 602 in FIG. 6A shows the maximum funnel nozzle size that mostly fall between 22-23 micron. In contrast, plot 608 in FIG. 6B shows a larger variation in the maximum funnel nozzle size, of between about 19 to 22.5 micron. Plot 604 in FIG. 6A shows the minimum funnel nozzle size that mostly fall between 21.5-22.4 micron. In contrast, plot 610 in FIG. 6B shows a significantly larger variation in the minimum funnel nozzle size, of between about 17 to 21.5 micron. Plot 606 in FIG. 6A shows the average funnel nozzle size that has much less variation than plot 612 in FIG. 6B.

Based on empirical data, such as those shown in FIGS. 6A and 6B, the diameter of the funnel bore varies more than the width of a KOH nozzle, such as those shown in FIG. 2A, where the nozzle has a straight slanted profile. A small fraction of the funnel bores can be substantially (1-3 μm) smaller than the population. Nozzle size variation can cause print line width variation, so nozzle plates with too much variation may have to be scrapped. For nozzle diameter variation specifications of ±1.5 μm, a large (e.g., 25%) die yield loss can result. As the size variation is not observed on straight bore holes etched into silicon wafers using non-reflowed resist, the processes outlined in FIG. 4A-4F address variability that may be induced by the reflow process. The modification to the funnel nozzle process produces funnel nozzles that have reduced bore size variation, as shown in FIG. 6A.

Figure 7A:
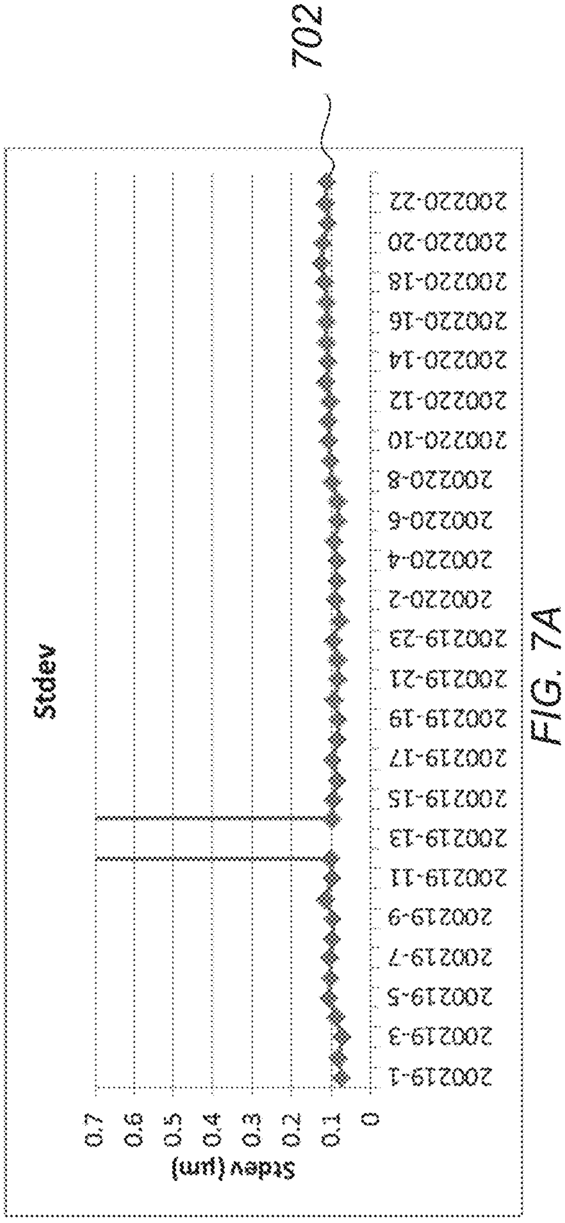
FIGS. 7A and 7B compare the standard deviation for nozzles sizes of nozzles made using the process shown in FIGS. 4A-4F and another process.
Figure 7B:
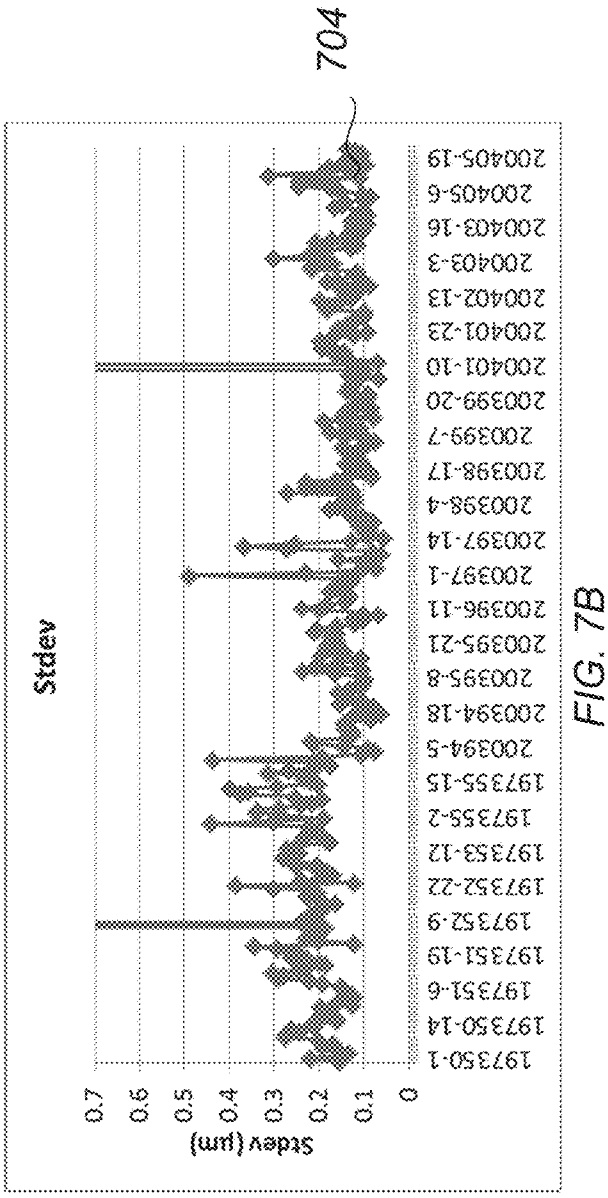

FIG. 7A shows a plot 702 of the standard deviation of the width of nozzles fabricated using the processes shown in FIGS. 4A-4F. Most of the nozzles have a standard deviation of about 0.1 micron. In contrast, FIG. 7B shows a plot 704 of the standard deviation of the width of nozzles fabricated using another process where the edges of the reflow resist defines the nozzles boundary of the straight-walled recess formed during the first etching process shown in FIG. 4C. The standard deviation in plot 704 is generally greater than 0.2 micron.

A number of implementations of the invention have been described. Nevertheless, it will be understood that various modifications may be made without departing from the spirit and scope of the invention. Exemplary methods of forming the aforementioned structures have been described. However, other processes can be substituted for those that are described to achieve the same or similar results. Accordingly, other embodiments are within the scope of the following claims.

What is claimed is:

1. A process for making a nozzle, the process comprising:

forming a first opening having a first width in a top layer of a substrate;

after forming the first opening, forming a patterned layer on a top surface of the substrate so that the patterned layer is disposed on the top layer of the substrate, the patterned layer defining a second opening spanning the first opening in the top layer, the second opening having a second width larger than the first width, and the second opening having curved side surfaces terminating on the top surface of the substrate;

etching a second layer of the substrate through the first opening in the top layer of the substrate to form a recess in the second layer of the substrate, the recess extending from a bottom surface of the recess to the top surface of the substrate and having a substantially constant width; and after the recess is formed, etching the curved side surface of the patterned layer, the top layer of the substrate, and the second layer of the substrate, where the etching forms a curved sidewall of the recess such the recess is wider at the top surface of the substrate than at a bottom surface of the recess.

2. The process of claim 1, comprising aligning the patterned layer on the top surface of the substrate using a stepper.

3. The process of claim 1, wherein forming the first opening comprises etching the first opening using a non-reflowed resist.

4. The process of claim 1, wherein the substrate is a semiconductor substrate, the second layer is an oxide layer having a high selectivity for a Bosch etching process.

5. The process of claim 1, wherein etching the second layer of the substrate to form the recess comprises etching the top surface of the substrate through the opening in the patterned layer using a Bosch process.

6. The process of claim 1, comprising reflowing the patterned layer to form the curved side surfaces of the second opening.

7. The process of claim 6, wherein reflowing the patterned layer comprises:

softening the patterned layer by heat until a top edge of the second opening becomes rounded; and after the softening by heat, re-hardening the patterned layer while the top edge of the second opening remains rounded.

8. The process of claim 7, wherein softening the patterned layer comprises heating the patterned layer having the second opening formed therein in a vacuum environment.

9. The process of claim 8, comprising heating the patterned layer having the second opening until the patterned layer reflows.

10. The process of claim 7, wherein re-hardening the patterned layer comprises cooling the patterned layer while the top edge of the second opening remains rounded.

11. The process of claim 1, wherein the etching to form the recess has substantially the same etch rates for the patterned layer and the substrate.

12. The process of claim 1, comprising etching the second layer of the substrate using a $CF_4/CHF_3$ gas mixture.

13. The process of claim 1, wherein the second width is about 1 μm larger than the first width.

14. The process of claim 1, wherein the patterned layer is at least 10 μm in thickness.

15. A process for making a nozzle, the process comprising:

forming a patterned layer on a top surface of a substrate so that the patterned layer is disposed on the top layer of the substrate, the patterned layer defining a second opening spanning a first opening in the top layer, the second opening having a second width larger than the first width and having curved side surfaces terminating on the top surface of the substrate, the first opening in the top layer having been formed prior to the forming of the patterned layer;

etching a second layer of the substrate through the first opening in the top layer of the substrate to form a recess in the second layer with outer edges of the first opening in the top layer defining a boundary of the recess, the recess extending from a bottom surface of the recess to the top surface of the substrate and having a substantially constant width; and after the recess is formed, etching the curved side surface of the patterned layer, the top layer of the substrate, and the second layer of the substrate, where the etching forms a curved sidewall of the recess such that the recess is wider at the top surface of the substrate than at a bottom surface of the recess.

16. The process of claim 15, comprising reflowing the patterned layer to form the curved side surfaces of the second opening.

17. The process of claim 16, wherein reflowing the patterned layer comprises:

softening the patterned layer by heat until a top edge of the second opening becomes rounded; and after the softening by heat, re-hardening the patterned layer while the top edge of the second opening remains rounded.

18. The process of claim 17, wherein softening the patterned layer comprises heating the patterned layer having the second opening formed therein in a vacuum environment.

19. The process of claim 18, comprising heating the patterned layer having the second opening until the patterned layer reflows.

20. The process of claim 17, wherein re-hardening the patterned layer comprises cooling the patterned layer while the top edge of the second opening remains rounded.

* * * * *